United States Patent [19]

Hines

[11] 4,122,870
[45] Oct. 31, 1978

[54] PROTECTIVE BUSHING TO ENCLOSE THE END OF A CONDUIT LINER

[76] Inventor: Vernon C. Hines, 1001 Tejon, Denver, Colo. 80204

[21] Appl. No.: 748,776

[22] Filed: Dec. 8, 1976

[51] Int. Cl.² .............................................. F16L 9/02
[52] U.S. Cl. ...................................... 138/109; 285/55
[58] Field of Search ................. 285/55; 138/137, 140, 138/143, 139, 153, 109

[56] References Cited

U.S. PATENT DOCUMENTS

| 215,481 | 5/1879 | Rider | 138/109 |
|---|---|---|---|
| 1,872,540 | 8/1932 | White | 138/109 X |
| 2,195,403 | 4/1940 | Bay | 285/55 X |
| 2,445,273 | 7/1948 | Kennedy | 285/55 X |
| 2,700,988 | 2/1955 | Smisko | 138/109 X |
| 2,901,024 | 8/1959 | Marsden | 138/109 X |
| 3,228,096 | 1/1966 | Albro | 285/55 X |
| 3,298,716 | 1/1967 | Taylor et al. | 285/55 |
| 3,399,908 | 9/1968 | Kurtz | 285/55 |
| 3,516,447 | 6/1970 | Pittman | 138/109 |
| 3,828,823 | 8/1974 | Douglas | 138/109 |

FOREIGN PATENT DOCUMENTS

1,451,391  9/1966  France .................................... 138/109

*Primary Examiner*—Richard E. Aegerter
*Assistant Examiner*—James E. Bryant, III
*Attorney, Agent, or Firm*—Richard D. Law

[57] ABSTRACT

A pipe, having a vulcanized, elastomeric liner within it, is finished off with a bushing at each end, the bushing being within the liner with its end being outwardly flared, as a bell mouth, to completely confine the end of the liner between the bushing and pipe. An unvulcanized elastomeric liner, characterized by a slight increase in volume when vulcanized, is used with the liner portion between the pipe and liner producing a very tight fit due to such expansion.

3 Claims, 4 Drawing Figures

PROTECTIVE BUSHING TO ENCLOSE THE END OF A CONDUIT LINER

This invention relates to the lining of conduit with elastomers, and more particularly to means to provide protection for the ends of such liners.

Conduits having protective elastomeric liners are extensively used for many applications. Liners are needed for sanitary and chemical protection for the contents carried in the conduit and, also, for chemical and mechanical protection for the conduit itself. Such elastomeric liners as synthetic plastics or of natural or synthetic rubber are desirable since they may be formed with very smooth internal surfaces to permit fluid substances to easily flow through the conduit. Also, such liners may be chosen to be most resistant to chemicals being transported through the conduit, and in some applications, they are necessary to protect the material of the conduit. Many such liners are, also, very resistant to wear, such as that which can occur by high velocity flow producing cavitation and abrasion or by a flowing pulp or slurry.

The installation of a liner in a conduit is accomplished by well known operations. A finished liner may be installed in a conduit, but preferably an unvulcanized liner is installed in the conduit and thereafter, it is subsequently vulcanized by heat treatment in order to obtain a secure bond to the internal surfaces within the conduit.

A weak point in a conduit, protected by lining, is invariably at an end of the conduit and at conduit connections where the liner must terminate. At such weak points, should a small area of unbonding occur, the liner could be ripped from the metal conduit. Also, the conduit metal would be exposed and it could be subject to attack by the carried fluid. Although the rubber or elastomeric liner may be vulcanized so as to be securely bonded to the inner wall of the conduit. The unprotected end portion of the liner is nevertheless vulnerable since it can be pulled away from the metal of conduit by high velocity flow. With some chemicals, even those which are not corrosive, the liquid may nevertheless seep between the liner and the conduit to separate the bond between them.

Various expedients have been used to avoid these problems created at the ends of liners. There have been attempts to develop special terminal ends and seals for the liner. A common expedient is to flare the lining outwardly against a connective flange in the pipe. However, this is not always desirable and there is a need for a more simple, reliable means for protecting the terminal end of a tubular rubber liner within a conduit.

THE INVENTION

The present invention was conceived and developed with the foregoing and other considerations in view. The invention is for, and is restricted to, that class of liners which are elastomers, which are vulcanized in the conduit and which expand when being vulcanized. However, such a restriction presents no field problems since most of elastomeric liners fall within the scope of such a specification. The invention comprises, in essence, a rigid bushing of a selected, resistant material fittable into a conduit over an end of the liner to enclose it. The end of the bushing is a flared, or belled form enlarged to fit snugly within the conduit wherein the liner is fitted. The bushing is installed when the unvulcanized liner is placed in the conduit so as to fit over the lining end. Thereafter, the operation of vulcanizing the liner in the conduit will proceed, and a small expansion of the liner during the vulcanizing operation will tightly secure it in the space between the conduit and the bushing.

OBJECTS OF THE INVENTION

It follows that the objects of the present invention are to provide a novel and improved bushing and an improved method for installing a bushing at a terminal end of an elastomeric liner within a conduit, which: prevents any exposure of the end of the liner to material flowing through the conduit; prevents the conduit itself from being exposed to the material flowing through the conduit; will effectively protect the metal forming a conduit where highly corrosive substances are involved; is a simple, neat appearing unit fitting very tightly in place; provide a smooth transition between the inner bushing end and the liner; and is easily installed in a lined conduit with a very tight fit in a simple sequence of steps.

GENERAL DESCRIPTION OF DRAWING

With the foregoing and other objects in view, my present invention comprises certain constructions, combinations and arrangements of materials, and sequences, operations and steps, all as hereinafter described in detail, defined in the appended claims, and supplemented by the accompanying drawing in which:

SPECIFIC DESCRIPTION OF THE DRAWINGS

Figure 1:
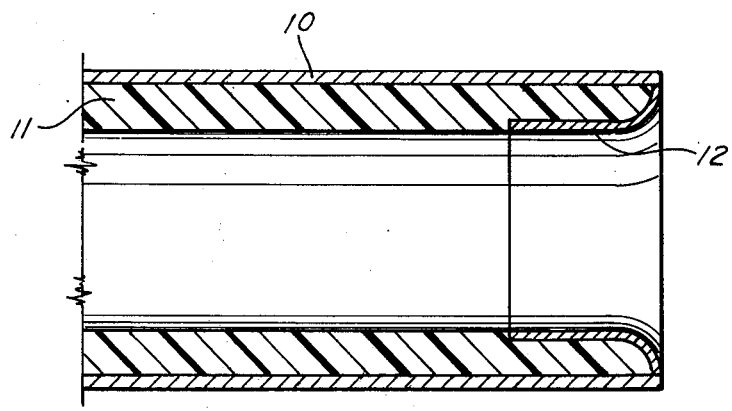
FIG. 1 is a longitudinal sectional view of an end portion of a conduit having a liner therein and with the improved connective bushing enclosing the end of the liner.

Referring more particularly to the drawings, FIG. 1 illustrates a general rigid materal conduit 10 having an elastomeric liner 11 within it, and a bushing 12 fitted over the end of the liner at the end of the conduit. The conduit 10 may be of practically any diameter and any length as needed, and may be manufactured of various different materials, preferably metal. It is essential that the strength of the conduit 10 be sufficient to withstand pressures imposed upon it when in use and, also, the pressure imposed by that portion of the liner 11 which lies between the conduit and the bushing. The latter pressure will arise when the liner is vulcanized and expands as hereinafter described.

A preferred material for the conduit is steel pipe, for such pipe is available in many different sizes and weights. It is, also, a comparatively low cost material, and is rigid and easily threaded or flanged for various connections. By using a liner in standard steel pipe, it can be made to function for purposes for which it would not otherwise be suitable, and it can then be used in lieu of much more expensive pipe such as stainless steel tubing. However, the conduit may be such materials as brass, copper, stainless steel, etc. depending upon the environment in which it is used.

The liner 11 may be of various thicknesses, depending upon the design factors of the system under consideration. In the present invention, this liner will be an elastomer which is vulcanized after it is in place within the liner. It must, also, be of an elastomer characterized by at least a minimum expansion in volume when it is vulcanized, and, preferably, of a type which bonds to the inner wall of the conduit when vulcanized, either directly or with the use of an adhesive or bonding agent which allows the elastomer to be completely bonded to the pipe metal. It is to be noted that the vulcanizing operation may, or may not, proceed with a mandrel or core, within the conduit, depending upon the type of material used. This, and the vulcanizing step of production and the use of adhesives or bonding agents for bonding elastomers to metal are well known to the art and need not be described in detail.

A significant number of natural and synthetic elastomers will increase in volume when vulcanized and this type of elastomer can be used in the present invention. Also, most types can be tightly bonded to the inner surface of the conduit when the vulcanizing step is completed. It was found that materials suitable for this use include natural rubber; polymers such as silicone rubber (Dow-Corning "silastic" rubber). The latter mentioned rubber will expand as much as 10 percent in volume when cured, but in the present invention, such expansion may be as small as 1% to be effective.

Figures 2, 3:
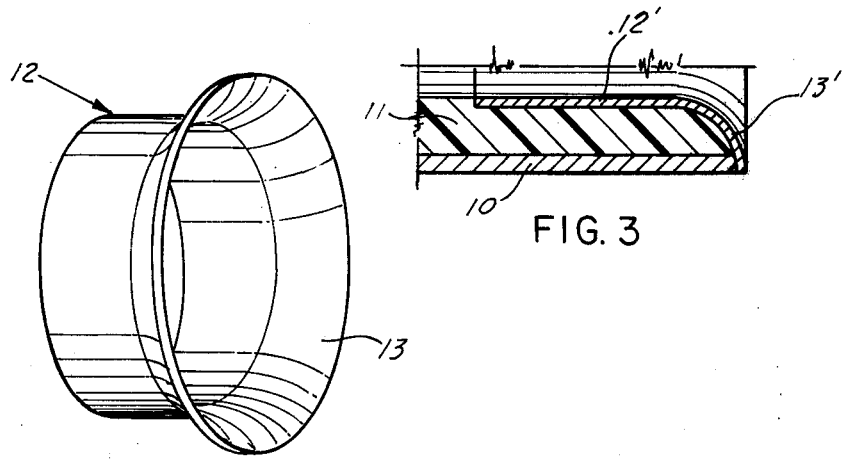
FIG. 2 is a perspective view of a bushing per se.
FIG. 3 is a fragmentary longitudinal sectional view similar to the showing at FIG. 1, but illustrating a modified type of bushing for protecting the liner.

The bushing 12, as illustrated in place at FIG. 1, and per se at FIG. 2, is a short, tubular member whose length may be approximately the same as its diameter, more or less. The internal diameter of the bushing is preferably the same, or nearly the same, as the internal diameter of the cured linear, and its thickness will be less than the thickness of the liner. This permits the end of the liner to be extended underneath the bushing, between it and the conduit as at end portion 11. The outward end 13 of the bushing is formed as a bell or flared end whose maximum outside diameter may be the same as the inside diameter of the conduit for a snug fit within the conduit. FIG. 1 illustrates the bushing 12 generally flush with the end of the conduit and as such, this is a normal location of the end of the bushing, but such is not essential.

The bushing will necessarily be formed of a rigid material, preferably metal, but of a selected type which can withstand the corrosive effects or stresses imposed upon it by the flow of fluids through the conduit. Stainless steel is one example of a material suitable for many special purposes. Certain types of strong, thermoplastic and thermosetting, synthetic resins could, also, be used. Further, the bushing, if of metal, may be protected by a suitable coating or skin such as might be applied by electroplating operations, e.g. chrome plated steel.

The formation of a conduit with a liner 11 and with a bushing 12 therein will follow a sequence of steps which include the regular steps of installing and vulcanizing the liner. The bushing may be installed in place in the liner or it may be installed as a subsequent step. The liner end portion 11', which lies bushing with the inside of the bushing matching the inside of the liner. However, since the liner will be an unvulcanized material, it will easily yield to pressure and the bushing may be forced into position within the liner with the liner portion 11 underneath the bushing yielding to permit the inside diameter of the bushing to match the inside diameter of the liner. When installed in this manner, the only preparation necessary is to cut the liner to a proper length. Thus, in the sequence of installing a liner in a pipe with the bushing 12 being in place, the first step will be to prepare the pipe 10 for receiving a liner which includes thorough cleaning and may include the application of a suitable bonding agent or adhesive to the inside of the pipe 10 to cause the liner to tightly adhere to the pipe when it is vulcanized. The next step is to lay up an unvulcanized liner 11 in the conduit, which lining material has been prepared at each end to provide a proper amount of material to fill the space 11' between the bushing 12 and the pipe. It is important to remove air under the liner in the lay up. The third step is to insert a bushing 12 at each end of the pipe, and it is to be noted that the insertion of the bushing may be at the same time or subsequent to installing the liner. After the bushing is in place, the fourth step is to vulcanize the liner within the pipe by a proper heating operation, usually in an autoclave. This vulcanization may take place with or without a mandrel extended through the pipe depending upon the liner material. It is to be noted that with expansion of the liner 11 when it is vulcanized, there will be a substantial pressure increase in the space between the pipe and the bushing and that the end portion 11' of the liner will be under considerable pressure. Actually, the liner material may be extruded from the small gap between the inner wall of the pipe and the edge of the bellmouth flare 13 to form a thin flashing of liner material at the end of the pipe. This flashing will be cut away to finish the operation.

The protective bushing 12 can be formed in various ways other than with the simple bell or flared end 13, illustrated at FIGS. 1 and 2. Also, some variations are possible in the placement of this bell, the unit illustrated at FIG. 1 has the bell internally at the end of the pipe. Where the bushing is to be placed at the end of the pipe, the modified unit illustrated at FIG. 3 may be preferred. In that unit, the bushing 12' has a bell end 13' which flares outwardly to as least the outside diameter of the pipe, so that is seats on the edge of the pipe wall. Actually, this flare could be even larger than that illustrated so that it could seal against a flange gasket or the like depending upon the type of connection of the pipe to another pipe or to a flange. The extended bell 13', illustrated at FIG. 3, can fully protect the end of the pipe 10 by preventing the end of the pipe and the small gap between the bellmouth and the pipe, heretofore described, from being exposed to a carried liquid.

Figure 4:
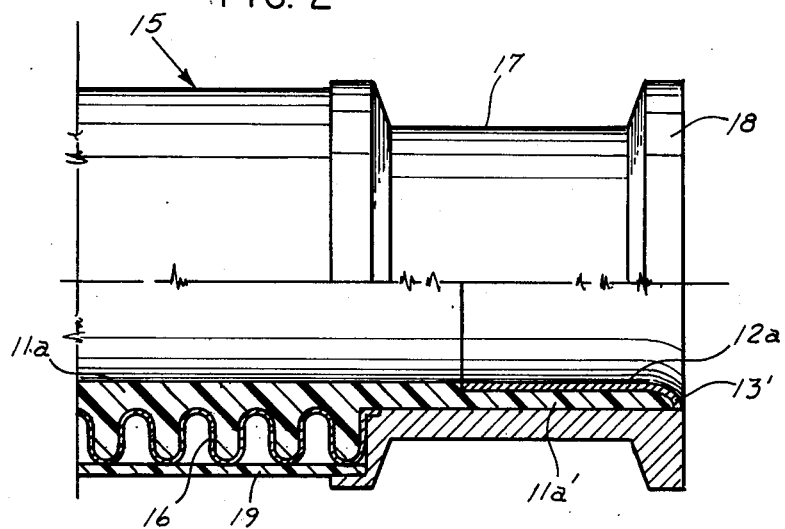
FIG. 4 is a longitudinal sectional view of another type of conduit which is lined with an elastomer and with the improved bushing at the end thereof.

In addition to providing for an alternate construction of the bushing, this bushing can be used with various types of pipes which are protected with liners. For example, FIG. 4 shows one end of a flexible convoluted, metal pipe section, shown general as 15, wherein a convoluted pipe 16 is connected to a mounting spool 17 having a flanged end 18 for connection to any other suitable flanged structure. This arrangement of a flexible pipe may include an external tubular sheath 19, or other flexible covering, secured to the inner end of the spool to protectively envelope the convoluted flex section 16. In the present invention, the inner portion of the pipe section is filled with a liner 11a which, also, fills the convoluted portions completely, extends into the spool section and to the end thereof. A bushing 12a will encase the end portion 11a' of this liner, and is installled in the same manner as heretofore described. The bell 13' is a snug fit in the spool portion 17, and generally should be flush with the face of flange section 18.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

What is claimed is:

1. The combination of a uniform diameter conduit along its length having an essentially rigid metal, squared outer end, tubular end member and an elastomeric lining in said conduit terminating closely adjacent the tubular end member, and
    (a) a uniform inner and outer diameter, smoothly belled flared end, rigid metal tubular bushing telescoped in said tubular end member, extending about the length of its diameter into said tubular end member and providing an annular space between the exterior of said bushing and the interior of the tubular end member,
    (b) the flared end of said bushing being in snug fitting contact with said tubular end member, and
    (c) said elastomeric lining being bonded to the interior of said tubular end member, completely filling said annular space and bonded to the exterior of said bushing, so as to provide no void spaces in said elastomeric filled annular space, and the interior diameter of said bushing being of the same interior diameter as the lining so as to form a smooth joint therebetween.

2. The combination defined in claim 1, wherein: the flared end of the bushing extends to the end of the tubular end member and in peripheral, snug fit contact with the inside surface of the tubular end member.

3. The combination defined in claim 1, wherein the flared end of the bushing has a diameter of substantially the same as the outer diameter of the tubular end member, thereby enclosing and overlying the square outer end and in contact with the squared outer end.

* * * * *